United States Patent [19]

Holmes

[11] 4,193,530

[45] Mar. 18, 1980

[54] METHOD OF SOLDERING TINPLATE CAN BODIES WITH A SULFUR RESISTANT TIN-ALLOY SOLDER

[75] Inventor: Edward W. Holmes, Darien, Ill.

[73] Assignee: The Continental Group, Inc., New York, N.Y.

[21] Appl. No.: 906,392

[22] Filed: May 16, 1978

[51] Int. Cl.$^2$ .................................. B22D 11/126
[52] U.S. Cl. ......................... 228/263; 75/175 A; 113/120 A; 220/75; 426/126; 426/131; 428/648
[58] Field of Search ............ 75/175 A; 426/126, 131; 428/648; 220/75, 1 BC; 113/120 A; 228/263

[56] References Cited

U.S. PATENT DOCUMENTS

| | | | |
|---|---|---|---|
| 1,777,983 | 10/1930 | Prahl | 220/75 |
| 3,055,775 | 9/1962 | Crittenden, Jr. et al. | 75/175 A |
| 3,268,344 | 8/1966 | Kamm | 426/126 |
| 3,367,751 | 2/1968 | Halley et al. | 428/648 |
| 3,982,314 | 9/1976 | Ariga et al. | 428/648 |

FOREIGN PATENT DOCUMENTS 913238  6/1954  Fed. Rep. of Germany ........ 75/175 A

*Primary Examiner*—L. Dewayne Rutledge
*Assistant Examiner*—Upendra Roy
*Attorney, Agent, or Firm*—Paul Shapiro; Joseph E. Kerwin; William A. Dittmann

[57] ABSTRACT

The interior side seam areas of tinplate can bodies exhibit improved resistance to corrosion by sulfur containing foods packaged therein when the side seam is soldered with a tin solder comprised of 0.1–0.5 percent by weight indium, 0.1–0.5 percent by weight bismuth, the remainder being tin.

3 Claims, No Drawings

METHOD OF SOLDERING TINPLATE CAN BODIES WITH A SULFUR RESISTANT TIN-ALLOY SOLDER

BACKGROUND OF THE INVENTION

1. Field of the Invention

The present invention relates to a novel solder for a can body and particularly to a tin solder composition for soldering the side seam of a tinplate can body having improved resistance to sulfur caused discoloration.

2. Description of the Prior Art

Metal containers for the packaging of food products are generally comprised of a tinplate body having two of its marginal edges interfolded by means of hooks to form a side seam. In the manufacture of the food cans, the can body is made by forming an enamel coated, flat tinplate blank into substantially tubular configuration, reversely bending the longitudinally extending margins thereof to form outer and inner reversely bent body hooks respectively, inter-engaging the body hooks, bumping the engaged hooks to mechanically lock them together and then flowing molten solder into the interstices between the locked body hooks whereby upon cooling, the solid solder bonds and hermetically seals the side seam. By the application of the solder, a joint is formed in which the solder extends into and around the body hooks and forms a thin line of solder on the inside of the can. After application of the solder, the side seam area is coated with an enamel coating.

the solder presently in general use for tinplate food containers is composed of a tin alloy of 98% lead and 2% tin. U.S. Pat. No. 3,268,344 discloses a solder for tinplate food containers composed of 100% tin.

The metal can industry has continually sought to improve the ability of soldered tinplate cans to withstand corrosive attack by a product packed therein in order to prevent the can from releasing undesirable contaminants into the food product. It is known that one of the more troublesome areas subject to corrosive attack and to contaminant formation is the side seam area of the can body; and to a large extent this corrosion susceptibility is due to blackening due to the formation of iron sulfide particles, which tend to degrade the appearance and the marketability of the can and product packed therein. Such blackening is caused by degradation products of sulfur-containing protein-rich foods such as meat and fish in contact with the soldered side seam area chemically attacking the area. Accordingly, there has been and still is a quest in the metal can industry to improve the resistance of soldered food cans to sulfur caused discoloration.

SUMMARY OF THE INVENTION

In accordance with the practice of the present invention, sulfide blackening in the side seam areas of tinplate containers having a soldered joint is reduced by employing in the manufacture of the soldered container, a sulfur-resistant solder composition comprised of a tin based alloy, the alloy being comprised of 0.1 to 0.5 percent by weight bismuth and 0.1 to 0.5 percent by weight indium, and the balance being substantially tin.

PREFERRED EMBODIMENTS

The tin solder alloys of the present invention contain 0.1–0.5 percent by weight indium, preferably 0.15–0.30 percent by weight indium and 0.1–0.5% by weight bismuth, preferably 0.15–0.30% by weight, with the remainder being tin.

The solders of the present invention are solders which are applicable over a temperature range of 240°–260° C. and are useful in the manufacture of food containers fabricated from tinplate.

In preparing the solder used in the practice of the present invention, a required quantity of tin is weighed out and heated to a molten condition, i.e., heated to about 275° C. To the molten tin are added the indium and bismuth components. The maximum quantity of indium that will go into solution with tin is 0.5% by weight of the tin. The melting point of indium is 156.2° C. After dissolution of the indium, a quantity of bismuth equivalent to 0.1–0.5% by weight of the tin is measured out and added to the molten tin-indium mixture. The melting point of the bismuth is approximately 271° C. The mixture of tin, bismuth and indium is agitated as the bismuth and indium melts into the molten tin. The resultant solder mixture is comprised substantially of 99.0 to 99.80% by weight tin and 0.1–0.5% by weight indium and 0.1–0.5% by weight bismuth.

When the molten tin, indium, bismuth mixture has become thoroughly mixed by agitation, the temperature of the mixture is reduced to approximately 240° to 260° C., which is the range useful for maintaining the molten alloy in condition for application to the can bodies to be soldered.

One form of apparatus conventionally used for applying solder to the can side seam is a solder roll which is rotatable in a reservoir for holding the molten solder mixture. This bath of solder is maintained in molten condition at the proper temperature of 240° to 260° C. The solder is applied to the interlocked side seam of the can by passing the side seam portion of the container through a series of solder rolls rotating in the bath of the molten solder. When the seam contacts the hot molten solder carried on the rolls, the solder is caused to flow into the interstices between the locked body hooks of the side seam whereby, upon cooling, the solid solder bonds and hermetically seals the interlocked side seam.

Thereafter, a second enamel coating or top coat formed from a thermosetting resin such as an epoxy-phenolic resin, ureaformaldehyde resin, alkyd resin, polybutadiene, polyvinyl butyral or a vinyl polymer resin such as a vinyl chloride-vinyl acetate copolymer is applied to the internal surfaces of the container, particularly in the area of the side seam, in a suitable manner as by spraying the resin diluted in a suitable volatile organic solvent to cover over the solder seam inside the can and to coat the inside surfaces thereof, using conventional can body spraying equipment. This second enamel coating is applied shortly after the seam is soldered so that the residual heat of the soldering operation will evaporate the solvent and harden the coating.

The present invention is illustrated by the following Example:

EXAMPLE

Luncheon meat was packed in a series (six) of tinplate containers, the side seam thereof being soldered with a solder composed of 0.25% by weight bismuth, 0.20% by weight indium and the remainder being tin. The cans were hermetically sealed with an end closure double seamed to the soldered can body. The series of sealed, packed containers were stored for subsequent inspection after 6 months storage at room temperature (77° F.).

After the 6 month storage period, the containers were opened and the interior areas of the container and product which are directly affected by the soldered side seam, i.e., the side seam and laps, were inspected for sulfur discoloration, i.e., black sulfide discoloration in the side seam and lap area as well as product discoloration which are the two most common problems encountered with canned luncheon meat products that are considered objectionable from an aesthetic standpoint by the consumer.

An average numerical value was assigned to the six cans in the series. This value corresponds to the degree of black sulfide and/or product discoloration observed at the side seam and lap areas. In the numerical rating system used, the lower the number, the less discoloration observed. The numerical values assigned were adopted from the following rating system:

| Numerical Value | Degree of Discoloration | Description of Discoloration |
| --- | --- | --- |
| 0 | None | No noticeable sign |
| 1 | Trace | Barely noticeable |
| 2 | Slight | Just noticeable, somewhat objectionable |
| 3 | Moderate | Noticeable, objectionable |
| 4 | Bad | Highly noticeable, objectionable |

An assigned value exceeding 1.5 is considered objectionable to render the product unmarketable.

the results of the container inspection are summarized in the Table below. For purposes of comparison, the procedure of the Example was repeated with the exception that the solder used was either a solder composed of tin (99.8% by weight) and bismuth (0.20% by weight) which solder was designated by the symbol "$C_1$", or a solder composed of 100% by weight tin, which solder was designated by the symbol "$C_2$". The results of the inspection of these comparative containers are also summarized in the Table.

Table

| Test | Can Interior Discoloration | | Meat Discoloration | |
| --- | --- | --- | --- | --- |
|  | Side Seam | Lap | Side Seam | Lap |
| Ex. | 0 | 0.5 | 0.7 | 0.5 |
| $C_1$ | 0 | 0.7 | 0.8 | 2.0 |
| $C_2$ | 1.0 | 0.2 | 2.0 | 1.0 |

By reference to the Table it is immediately apparent that cans soldered in accordance with the present invention (Test Ex.) exhibit substantially less container and meat discoloration than cans soldered with solder materials outside the scope of the present invention (Tests $C_1$ and $C_2$).

What is claimed is:

1. A method of soldering the side seams of tinplate can bodies which comprises
    providing a sulfur-resistant solder consisting essentially of about 0.1 to about 0.5 percent by weight indium, about 0.1 to 0.5 percent by weight bismuth, the remainder being tin,
    maintaining the solder in a molten condition,
    applying the molten solder to the side seam of the can body to provide the side seam with a layer of the solder.
2. The method of claim 1 wherein indium is present in the solder at a concentration of 0.15-0.30 percent by weight.
3. The method of claim 1 wherein bismuth is present in the solder at 0.15 to 0.30 percent by weight.

* * * * *